United States Patent
Leu et al.

(10) Patent No.: US 6,669,766 B2
(45) Date of Patent: Dec. 30, 2003

(54) DYE SET AND INK COMPOSITION WITH HIGH WATER-FASTNESS

(75) Inventors: Yi-Jing Leu, Hsinchu (TW); In-Shan Sir, Kaohsiung (TW); Chia-Hsin Chien, Taoyuan Hsien (TW); Yu-chang Shen, Taipei (TW); Yu-Ting Lin, Lu-Chou (TW)

(73) Assignee: BenQ Corporation, Taoyuan (TW)

( * ) Notice: Subject to any disclaimer, the term of this patent is extended or adjusted under 35 U.S.C. 154(b) by 0 days.

(21) Appl. No.: 10/177,457

(22) Filed: Jun. 20, 2002

(65) Prior Publication Data

US 2003/0019393 A1 Jan. 30, 2003

(30) Foreign Application Priority Data

Jul. 13, 2001 (TW) ........................................ 90117200 A

(51) Int. Cl.$^7$ ................................................ C09D 11/00
(52) U.S. Cl. ................................ 106/31.27; 106/31.43; 106/31.48
(58) Field of Search ........................ 106/31.27, 31.48, 106/31.43; 347/100

(56) References Cited

U.S. PATENT DOCUMENTS

| | | | | |
|---|---|---|---|---|
| 4,631,085 A | | 12/1986 | Kawanishi et al. | ...... 106/31.48 |
| 4,713,113 A | | 12/1987 | Shimada et al. | ............ 106/31.5 |
| 4,737,190 A | | 4/1988 | Shimada et al. | ......... 106/31.48 |
| 5,534,051 A | * | 7/1996 | Lauw | ...................... 106/31.43 |
| 5,536,306 A | * | 7/1996 | Johnson et al. | .......... 106/31.49 |
| 5,688,311 A | * | 11/1997 | Adamic | .................... 106/31.86 |
| 5,785,743 A | * | 7/1998 | Adamic et al. | ........... 106/31.27 |
| 5,925,177 A | | 7/1999 | Carreira et al. | ........... 106/31.43 |
| 6,247,808 B1 | * | 6/2001 | Ma et al. | ...................... 347/100 |
| 6,511,169 B1 | * | 1/2003 | Gallo et al. | ................... 347/100 |
| 6,511,170 B1 | * | 1/2003 | Gallo et al. | ................... 347/100 |
| 6,562,115 B2 | * | 5/2003 | Baettig et al. | ............ 106/31.51 |
| 2002/0185034 A1 | * | 12/2002 | Koga et al. | ............... 106/31.27 |
| 2003/0061963 A1 | * | 4/2003 | Blease et al. | .............. 106/31.27 |

* cited by examiner

*Primary Examiner*—C. Melissa Koslow
*Assistant Examiner*—Veronica F. Faison
(74) *Attorney, Agent, or Firm*—Ladas & Parry

(57) ABSTRACT

A water-soluble dye set used in thermal bubble color ink-jet printers. The dye set has high water-fastness and includes (a) Direct Blue 199 dye and Acid Blue 9 dye; (b) Reactive Red 180 dye, Acid Red 52 dye, and Direct Red 75 dye; and (c) Direct Yellow 132 dye and Acid Yellow 5 dye. The dye set of the present invention has improved heat stability and storage stability when used in thermal bubble ink-jet printers. In addition, the dye set has special viscosity, good surface tension, and high water resistance, greatly improving printing properties.

25 Claims, 3 Drawing Sheets

DYE SET AND INK COMPOSITION WITH HIGH WATER-FASTNESS

BACKGROUND OF THE INVENTION

1. Field of the Invention

The present invention relates to a multicolor dye set with high water-fastness, an ink composition including the dye set, and its application in ink-jet printing.

2. Background of the Invention

Color ink for color ink-jet printing requires a wide color range and ideal color matching. A primary dye set includes cyan ink, magenta ink, yellow ink, and black ink. A secondary dye set includes other colorants obtained from matching the dyes of the primary dye set.

In fact, a successful ink composition for color ink-jet printing must meet the following requirements: good crusting resistance, good stability, proper viscosity, proper surface tension, high color saturation, little color-to-color bleed, and rapid dry time. In addition, a successful ink composition can be ejected onto plain paper without clogging.

Color can be specified by two systems: color appearance system and color mixing system. Color appearance system is a system obtained from collecting data of actual colored objects and systematically generalizing the data. Examples include the Ostwald color system, the Munsell color system, and the DIN color system. Color mixing system is based on the principle that primary colors stimulus can be matched to generate various colors. Presently, the most important color mixing system is the CIE calorimetric system, which measures color instrumentally. For example, the Munsell color system was developed by Munsell, an American painter, and is the most famous system, describing color by hue, value, and chroma. For the CIE colorimetric system, the color stimulus (stimulus X, Y, and Z) and sensation of color are caused by the incorporation of light sources, objects, and observers. Chromaticity diagram is defined by three values $L^*$, $a^*$, and $b^*$. $L^*$ indicates the lightness of a color, $a^*$ the hue, and $b^*$ the chroma of a color. $a^*$ ranges from $-a$ (green) to $+a$ (red), and $b^*$ ranges from $-b$ (blue) to $+b$ (yellow). In 1976, the CIE system further incorporates hue angle ($h^0$) and chroma ($C^*$) (see Formula 1 and 2). In the CIELAB chromaticity diagram, color difference ($\Delta E$) indicates the color difference between two color samples (see Formula 3). The greater the $\Delta E$, the greater the color difference between two color samples. OD (optical density), also represented by absorbency, is defined by Formula 4. After a light with intensity $I_0$ irradiates an object, the residual intensity is $I$.

$$h^0 = \tan^{-1}(b^*/a^*) \quad \text{Formula 1}$$

$$C^* = (a^{*2} + b^{*2})^{1/2} \quad \text{Formula 2}$$

$$\Delta E = (\Delta L^{*2} + \Delta a^{*2} + \Delta b^{*2})^{1/2} \quad \text{Formula 3}$$

$$OD = \log(I_o/I) \quad \text{Formula 4}$$

Therefore, when an ideal ink composition is used to conduct ink-jet printing, it must provide ultimate color characteristics, such as good hue and high chroma. In the present invention, the water-fastness of each ink composition is determined by evaluating $\Delta E$ based on Formula 3. A smaller $\Delta E$ indicates that the ink composition fades color to a smaller extent after water washing and has better water-fastness.

Generally speaking, if the ink for ink-jet printing includes only one colorant, it easily causes plugging at the nozzle. Therefore, many kinds of humectants are generally added. However, this easily causes a slower drying rate and poor water-fastness. For example, in U.S. Pat. No. 4,631,085 (1986), U.S. Pat. No. 4,713,113 (1987), and U.S. Pat. No. 4,737,190 (1988), the ink includes a single colorant, and a humectant is required to prevent coagulation. U.S. Pat. No. 5,925,177 (1999) discloses an ink composition including Acid Yellow 23 dye, urea, and water. The addition of urea can prevent plugging of the nozzles resulting from crystallization of the yellow dye.

The ink composition for color ink-jet printers generally includes four kinds of ink, that is, magenta ink, cyan ink, yellow ink, and black ink, which are mainly water-based dyes. In recent years, the ink composition includes six kinds of ink, that is, magenta ink, cyan ink, yellow ink, black ink, light magenta ink, and light cyan ink, or seven kinds of ink with an additional light yellow ink. The ink composition includes at least one water-based (water-soluble) dye, water, an organic solvent, and other additives. However, such dye-based water-based ink has inferior water-fastness and light resistance.

Therefore, pigment-based inks with good water-fastness and light resistance have been developed in recent years. Such ink includes at least one pigment, water, an organic solvent, and other additives. The ink-jet ink using pigment as the colorant has better water-fastness and light resistance than a dye-based ink. However, dispersants or adhesives must be added to the pigment-based ink. In addition, pigment has a larger particle size, which easily causes precipitation and coagulation, thus plugging the nozzle and negatively impacting printing properties.

SUMMARY OF THE INVENTION

One object of the present invention is to provide a water-soluble multicolor dye set with high water-fastness.

The second object of the present invention is to provide an ink composition including the above-mentioned multicolor dye set.

The third object of the present invention is to provide an ink-jet printing method using the above-mentioned ink composition.

The fourth object of the present invention is to provide a novel water-soluble magenta dye set and an ink composition including the dye set.

The fifth object of the present invention is to provide a novel water-soluble yellow dye set and an ink composition including the dye set.

To achieve the above-mentioned objects, the water-soluble multicolor dye set includes the following components:

(a) Direct Blue 199 dye and Acid Blue 9 dye;
(b) Reactive Red 180 dye, Acid Red 52 dye, and Direct Red 75 dye; and
(c) Direct Yellow 132 dye and Acid Yellow 5 dye.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 1:
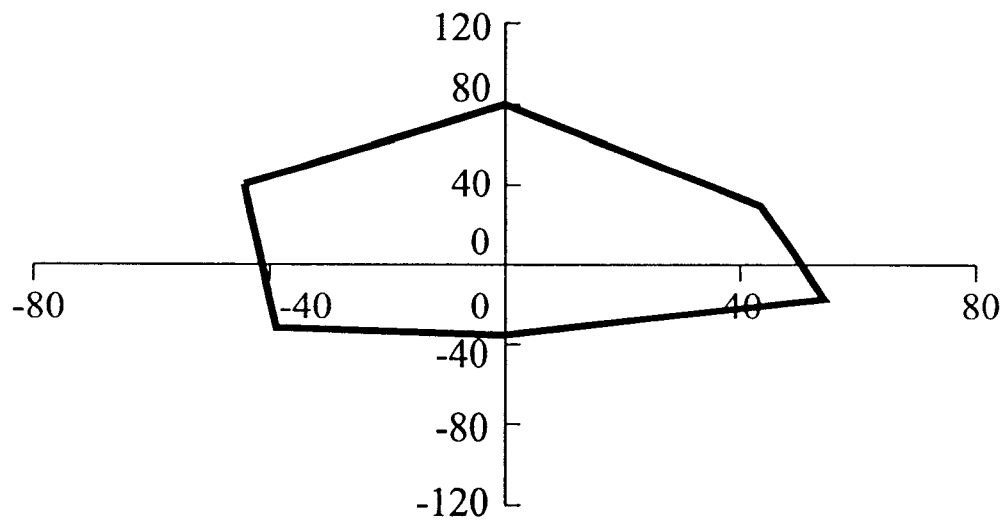
FIG. 1 is a chromaticity diagram of print paper according to the Example of the present invention before the water-fastness test.

The present invention provides a water-soluble (water-based) multicolor dye set with high water-fastness. The dye set includes the following components:

(a) water-soluble cyan dye set including: Direct Blue 199 dye and Acid Blue 9 dye;

(b) water-soluble magenta dye set including: Reactive Red 180 dye, Acid Red 52 dye, and Direct Red 75 dye; and (c) water-soluble yellow dye set including: Direct Yellow 132 dye and Acid Yellow 5 dye.

In the above components, Direct Blue 199 dye and Acid Blue 9 dye used in component (a) are conventionally used blue dyes. Component (b) magenta dye set and component (c) yellow dye set are first developed in the present invention.

In component (a) cyan dye set of the present invention, Direct Blue 199 dye and Acid Blue 9 dye are available from Clariant, Germany.

In component (b) magenta dye set of the present invention, Reactive Red 180 dye and Direct Red 75 dye are available from Bayer, Germany, and Acid Red 52 dye is available from Clariant, Germany. The present invention also embraces an ink composition including this magenta dye set.

In component (c) yellow dye set of the present invention, Direct Yellow 132 dye is available from Bayer, Germany, and Acid Yellow 5 dye from BASF, Germany. The present invention also embraces an ink composition including this yellow dye set.

The ink composition of the present invention includes the above-mentioned multicolor dye set and an aqueous medium. The ink-jet printing method of the present invention includes providing the ink of the present invention to an ink-jet printing device; and ejecting the ink onto a recording medium.

The ink composition of the present invention has improved heat stability and storage stability when used in thermal bubble ink-jet printers. In addition, the ink composition has special viscosity, good surface tension, and high water resistance, greatly improving printing properties.

In the ink composition of the present invention, each dye is preferably added in amount of 0.1 to 10 weight %, more preferably 2 to 5 weight %, based on the total weight of the ink composition.

The ink composition of the present invention includes an aqueous medium. In addition to water, the aqueous medium can further include a water-soluble or water-miscible organic solvent, such as cyclohexane, methanol, ethanol, ethylene glycol, diethylene glycol, triethylene glycol, polyethylene glycol, propylene glycol, butylene glycol, pentylene glycol, hexylene glycol, or polyhydroxy diols.

The ink composition of the present invention can further include a surfactant. The main function of the surfactant is to decrease the surface tension of the ink. Further, the moisturizing effect can be increased, thus making ink delivery and ejection more smooth. The surfactant also functions as a dispersant. The ink composition of the present invention can include at least one surfactant. The surfactant can be anionic, cationic, non-ionic, or zwitterionic and added in a total amount below 20.0 weight %. Representative examples of the suitable surfactants include polyethanediol, polypropanediol, EO/PO copolymer, sodium dioctyl sulfosuccinate, polybutyl resin, cellulose derivatives, styrene/acrylic copolymer resin, maleic acid/styrene copolymer, or polymers containing both hydrophilic and hydrophobic segments.

The ink composition of the present invention can further include a humectant. The humectant is usually a low volatile liquid and has good miscibility with the main solution. The addition of the humectant can prevent the ink at the nozzle of the ink cartridge from evaporation, which can generate precipitation and crystals, thus preventing plugging of the nozzle. Typical humectants used in the ink-jet ink can be ethylene glycol, diethylene glycol, or glycerol, added in an amount of 10.0 to 30.0 weight %.

The ink composition of the present invention can further include a pH buffer solution. The colorant can create ideal colors only in a suitable pH range. The pH buffer solution suitable for use can be diethanolamine, triethanolamine, hydroxides of alkali metal such as lithium hydroxide, sodium hydroxide, and potassium hydroxide, ammonium hydroxide, and carbonates of alkali metals such as lithium carbonate, sodium carbonate, and potassium carbonates.

The ink composition of the present invention can further include a chelating agent. The addition of the chelating agent can prevent generation of crystalline salt. This prevents coagulation of particles and plugging of the nozzle of the ink cartridge. Chelating agents suitable for use include sodium ethylenediaminetetraacetate, trisodium nitrilotriacetate, hydroxyethyl ethylenediamine trisodium acetate, diethylenetriamino pentasodium acetate, and uramil disodium acetate.

In addition, the ink composition of the present invention can further include a UV-blocker to block the absorbance of the UV light and increase the light resistance of the colorant. A biocide or preservative can be added to inhibit the growth of microorganisms. A dispersant can be added to increase the dispersing ability of the additives in the ink.

The following examples are intended to illustrate the process and the advantages of the present invention more fully without limiting its scope, since numerous modifications and variations will be apparent to those skilled in the art.

EXAMPLE

A three-color ink composition was prepared by mixing the following (a), (b), and (c) components.

(a) 3 wt % of Direct Blue 199 dye 2 wt % of Acid Blue 9 dye 4.0 wt % of PEG 700 (polyethylene glycol 700) available from U.C.C.

4.0 wt % of 2-pyrrolidone available from DOW 4.0 wt % of 2-ethyl-2-(hydromethyl)-1,3-propanediol (EHMPD) available from Lancaster 2.0 wt % of surfactant 13-S-5 available from Sino-Japan Chemical 2.0 wt % of surfactant 13-S-7 available from Sino-Japan Chemical 3.0 wt % of surfactant OT-75 available from KYOWA 0.5 wt % of surfactant 465 available from Air Product 2.5 wt % of 1,4-butanediol available from Lancaster 0.5 wt % of biocide SL-700 available from KYOWA deionized water (b) 2 wt % of Reactive Red dye 180 dye available from Bayer 1.5 wt % of Acid Red 52 dye available from Clariant, 1 wt % of Direct Red 75 dye available from Bayer 4.0 wt % of PEG 700 (polyethylene glycol 700) available from U.C.C.

4.0 wt % of 2-pyrrolidone available from DOW 4.0 wt % of 2-ethyl-2-(hydromethyl)-1,3-propanediol (EHMPD) available from Lancaster 2.0 wt % of surfactant 13-S-5 available from Sino-Japan Chemical 2.0 wt % of surfactant 13-S-7 available from Sino-Japan Chemical 3.0 wt % of surfactant OT-75 available from KYOWA 0.5 wt % of surfactant 465 available from Air Product 2.5 wt % of 1,4-butanediol available from Lancaster 0.5 wt % of biocide SL-700 available from KYOWA deionized water (c) 2.5 wt % of Direct Yellow 132 dye available from Bayer 1 wt % of Acid Yellow 5 dye available from BASF 4.0 wt % of PEG 700 (polyethylene glycol 700) available from U.C.C.

Figure 2:
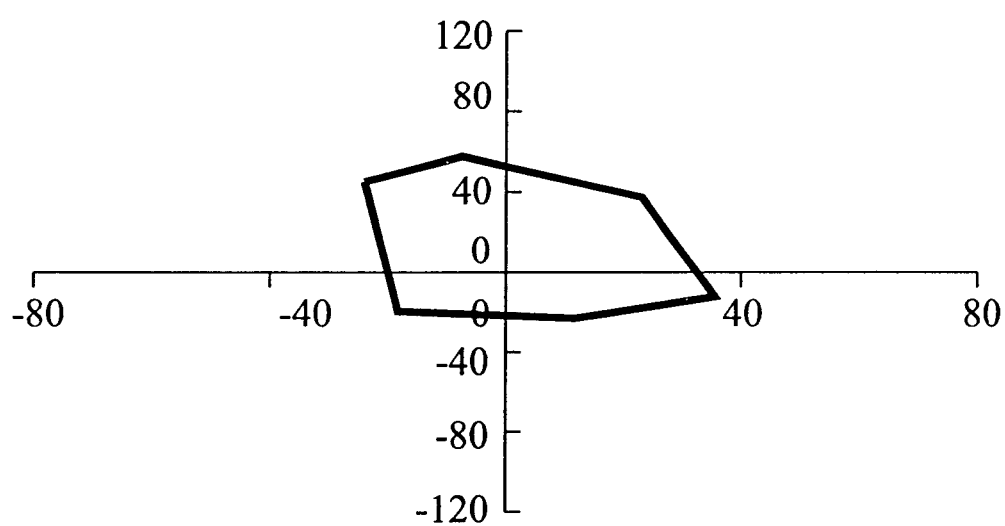
FIG. 2 is a chromaticity diagram of print paper according to the Example of the present invention after the water-fastness test.

4.0 wt % of 2-pyrrolidone available from DOW 4.0 wt % of 2-ethyl-2-(hydromethyl)-1,3-propanediol (EHMPD) available from Lancaster 2.0 wt % of surfactant 13-S-5 available from Sino-Japan Chemical 2.0 wt % of surfactant 13-S-7 available from Sino-Japan Chemical 3.0 wt % of surfactant OT-75 available from KYOWA 0.5 wt % of surfactant 465 available from Air Product 2.5 wt % of 1,4-butanediol available from Lancaster 0.5 wt % of biocide SL-700 available from KYOWA deionized water Ink-jet printing onto a commercially available plain paper in a commercially available ink-jet printer proceeded using the above ink composition. The chromaticity diagram of the as-print paper is shown in FIG. 1. The paper after printing was checked for ΔE for each color. The water-fastness of the color dye was measured by the following method. The paper after printing was placed in deionized water for 30 minutes of washing, removed from washing, dried at room temperature, and then checked for ΔE for each color. The chromaticity diagram of the print paper after the water-fastness test is shown in FIG. 2.

Comparative Example

The three-color ink composition used in this Comparative Example was the ink in a commercially available Epson 193 color ink cartridge. The paper used was commercially available plain paper. The printer used was a commercially available ink-jet printer.

Figure 3:
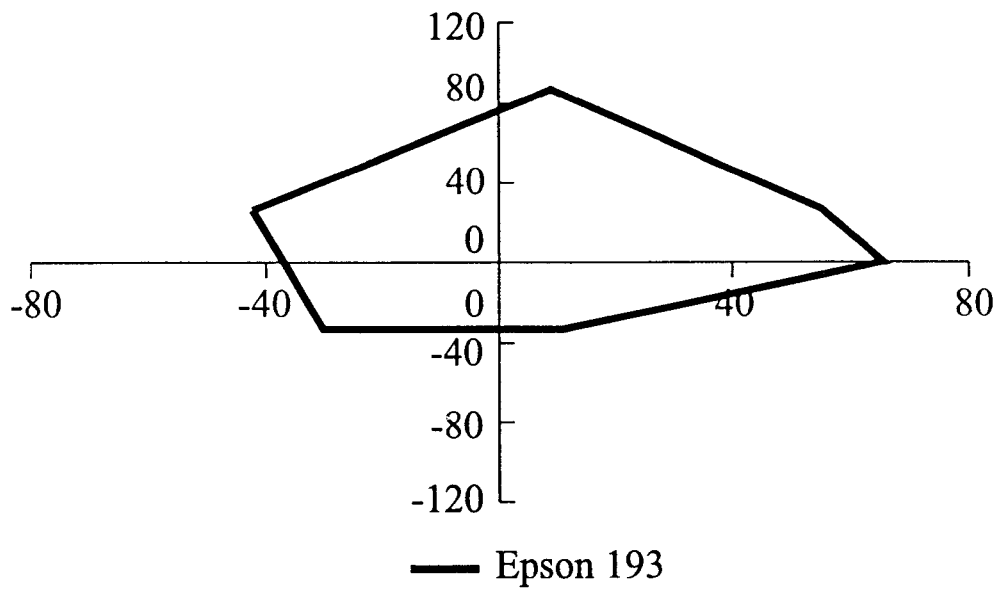
FIG. 3 is a chromaticity diagram of print paper according to the Comparative Example before the water-fastness test.
Figure 4:
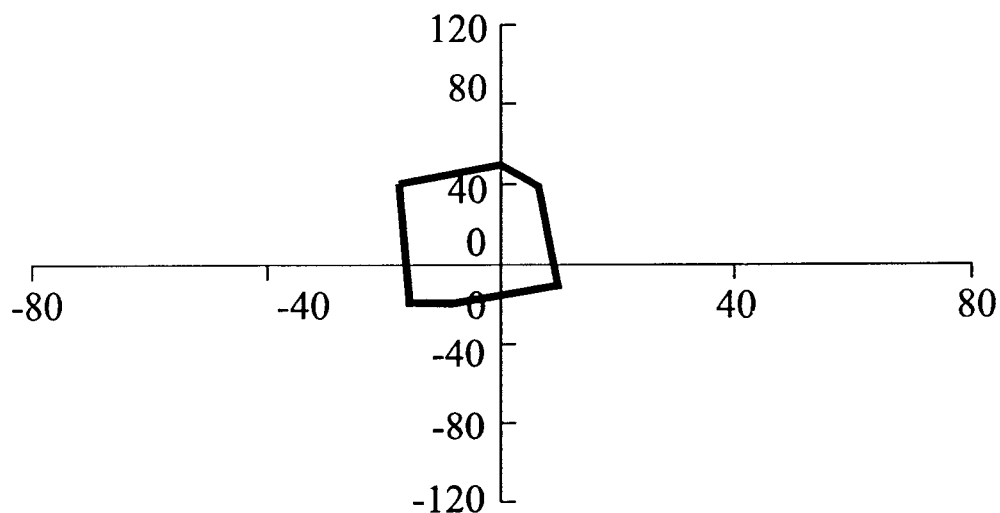
FIG. 4 is a chromaticity diagram of print paper according to the Comparative Example after the water-fastness test.

Ink-jet printing was conducted onto the paper in the ink-jet printer using the above ink composition. The chromaticity diagram of the as-print paper is shown in FIG. 3. The paper after printing was checked for ΔE for each color. The water-fastness of the color dye was measured by the following method. The paper after printing was placed in deionized water for 30 minutes of washing, removed from washing, dried at room temperature, and then checked for ΔE for each color. The chromaticity diagram of the print paper after the water-fastness test is shown in FIG. 4.

Figure 5:
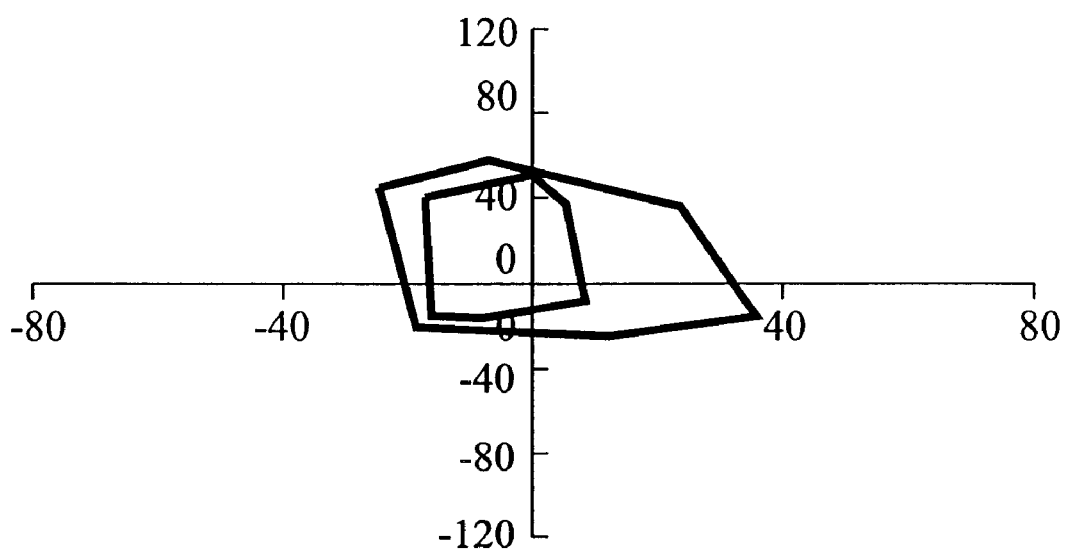
FIG. 5 shows the comparison between the chromaticity diagrams of the printed paper of the Example and the Comparative Example after the water-fastness test. The outer curve indicates that of the ink composition of Example and the inner curve indicates that of the ink composition of Comparative Example.

The comparison between the chromaticity diagrams of the printed paper of the Example and Comparative Example after the water-fastness test is shown in FIG. 5.

ΔE values of magenta and yellow inks after the water-fastness test for the printed paper of the Example and Comparative Example are shown in Table 1.

TABLE 1

|  | Magenta ink | | Yellow ink | |
| --- | --- | --- | --- | --- |
|  | Example | Comparative Example | Example | Comparative Example |
| ΔE | ⊚ | Δ | ○ | Δ |

Note 1:
⊚ indicates that ΔE is below 30
○ indicates that ΔE is 30–50
Δ indicates that ΔE is 50–70
Note 2:
ΔE is used to determine the water-fastness. A lower ΔE indicates that the ink composition faded color to a smaller extent after water washing and has better water-fastness.

The foregoing description of the preferred embodiments of this invention has been presented for purposes of illustration and description. Obvious modifications or variations are possible in light of the above teaching. The embodiments chosen and described provide an excellent illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A water-soluble dye set, comprising the following components:
    (a) Direct Blue 199 dye and Acid Blue 9 dye;
    (b) Reactive Red 180 dye, Acid Red 52 dye, and Direct Red 75 dye; and
    (c) Direct Yellow 132 dye and Acid Yellow 5 dye.

2. A water-soluble magenta dye set, comprising:
    Reactive Red 180 dye, Acid Red 52 dye, and Direct Red 75 dye.

3. A water-soluble yellow dye set, comprising:
    Direct Yellow 132 dye and Acid Yellow 5 dye.

4. An ink composition, comprising:
    a dye set including the following components: (a) Direct Blue 199 dye and Acid Blue 9 dye; (b) Reactive Red 180 dye, Acid Red 52 dye, and Direct Red 75 dye; and (c) Direct Yellow 132 dye and Acid Yellow 5 dye; and
    a medium, which is an aqueous solution.

5. The ink composition as claimed in claim 4, wherein component (a) includes 0.1 to 10 weight % of Direct Blue 199 dye and 0.1 to 10 weight % of Acid Blue 9 dye.

6. The ink composition as claimed in claim 4, wherein component (b) includes 0.1 to 10 weight % of Reactive Red 180 dye, 0.1 to 10 weight % of Acid Red 52 dye, and 0.1 to 10 weight % of Direct Red 75 dye.

7. The ink composition as claimed in claim 4, wherein component (c) includes 0.1 to 10 weight % of Direct Yellow 132 dye and 0.1 to 10 weight % of Acid Yellow 5 dye.

8. The ink composition as claimed in claim 4, wherein the medium further comprises an organic solvent.

9. The ink composition as claimed in claim 4, wherein the medium further comprises a surfactant.

10. The ink composition as claimed in claim 4, wherein the medium further comprises a pH buffer solution.

11. The ink composition as claimed in claim 4, wherein the medium further comprises a chelating agent.

12. The ink composition as claimed in claim 4, wherein the medium further comprises a biocide.

13. A magenta ink composition, comprising:
   a dye set including Reactive Red 180 dye, Acid Red 52 dye, and Direct Red 75 dye; and
   a medium, which is an aqueous solution.

14. A magenta ink composition as claimed in claim 13, wherein the dye set includes 0.1 to 10 weight % of Reactive Red 180 dye, 0.1 to 10 weight % of Acid Red 52 dye, and 0.1 to 10 weight % of Direct Red 75 dye.

15. A yellow ink composition, comprising:
   a dye set including Direct Yellow 132 dye and Acid Yellow 5 dye; and
   a medium, which is an aqueous solution.

16. The yellow ink composition as claimed in claim 15, wherein the dye set includes 0.1 to 10 weight % of Direct Yellow 132 dye and 0.1 to 10 weight % of Acid Yellow 5 dye.

17. An ink-jet printing method, comprising:
   providing ink to an ink-jet printing device, wherein the ink includes the following components:
   (1) a dye set including: (a) Direct Blue 199 dye and Acid Blue 9 dye; (b) Reactive Red 180 dye, Acid Red 52 dye, and Direct Red 75 dye; and (c) Direct Yellow 132 dye and Acid Yellow 5 dye; and
   (2) a medium, which is an aqueous solution; and
   ejecting the ink onto a recording medium.

18. The method as claimed in claim 17, wherein the component (a) includes 0.1 to 10 weight % of Direct Blue 199 dye and 0.1 to 10 weight % of Acid Blue 9 dye.

19. The method as claimed in claim 17, wherein the component (b) includes 0.1 to 10 weight % of Reactive Red 180 dye, 0.1 to 10 weight % of Acid Red 52 dye, and 0.1 to 10 weight % of Direct Red 75 dye.

20. The method as claimed in claim 17, wherein the component (c) includes 0.1 to 10 weight % of Direct Yellow 132 dye and 0.1 to 10 weight % of Acid Yellow 5 dye.

21. The method as claimed in claim 17, wherein the ink further includes an organic solvent.

22. The method as claimed in claim 17, wherein the ink further includes a surfactant.

23. The method as claimed in claim 17, wherein the ink further includes a pH buffer solution.

24. The method as claimed in claim 17, wherein the ink further includes a chelating agent.

25. The method as claimed in claim 17, wherein the ink further includes a biocide.

* * * * *